United States Patent
Okorokov et al.

[15] 3,705,559
[45] Dec. 12, 1972

[54] ROOT CROP PLANTER

[72] Inventors: Ivan Fedorovich Okorokov; Gorgy Porfirievich Bogdanov; Konstantin Alexandrovich Sorokin; Anatoly Fedorovich Onischenko; Pavel Efimovich Ziborov; Samuil Nisonovich Perstnev, all of Kharkov, U.S.S.R.

[73] Assignee: Ukrainsky Nauchno-Issledovatelsky Institut Selskokhozyaistvennogo Mashinostroenia Prospekt Gayarina, Kharkov, U.S.S.R.

[22] Filed: May 14, 1971

[21] Appl. No.: 143,455

Related U.S. Application Data

[63] Continuation-in-part of Ser. No. 776,166, Nov. 15, 1968, abandoned.

[52] U.S. Cl..................................111/3, 111/91
[51] Int. Cl...................................A01c 11/00
[58] Field of Search..........................111/2.3, 91

[56] References Cited

UNITED STATES PATENTS 2,486,462  11/1949  Carelock ..................... 111/3 X
2,625,122  1/1953  Carelock ..................... 111/3

Primary Examiner—Robert E. Pulfrey
Assistant Examiner—Stephen C. Pellegrino
Attorney—Waters, Roditi, Schwartz & Nissen

[57] ABSTRACT

The planter comprises planting units consisting of two support wheels longitudinally and transversely offset with respect to each other, so that one of the wheels is located aside, and displaced to the rear, of the other wheel, with regard to the direction of movement of the planter. The wheels are connected to each other by horizontal links which are hingedly secured to the wheel rims so, that the distance between the centers of the hinges along the rim equals one eighth of the length of the wheel rim circumference. The horizontal links are made with a two-step deflection, one step of which forms with the rim of the front support wheel a gap for the passage of the adjacent horizontal link, while the other step forms with the planting devices a gap for the passage of the root knockouts, as two adjacent horizontal links are located in one horizontal plane.

3 Claims, 7 Drawing Figures

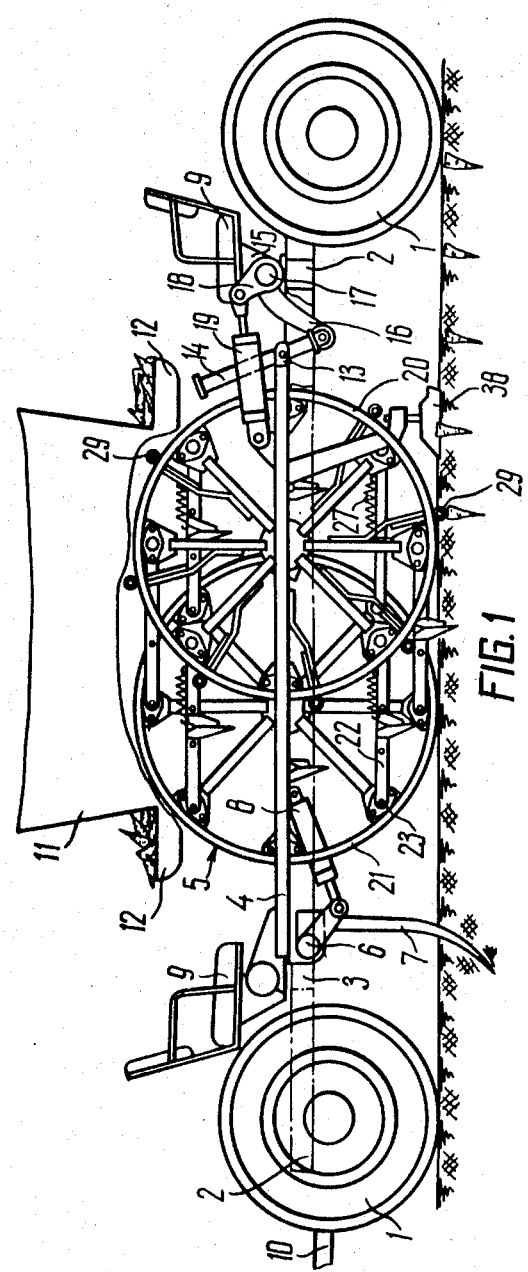
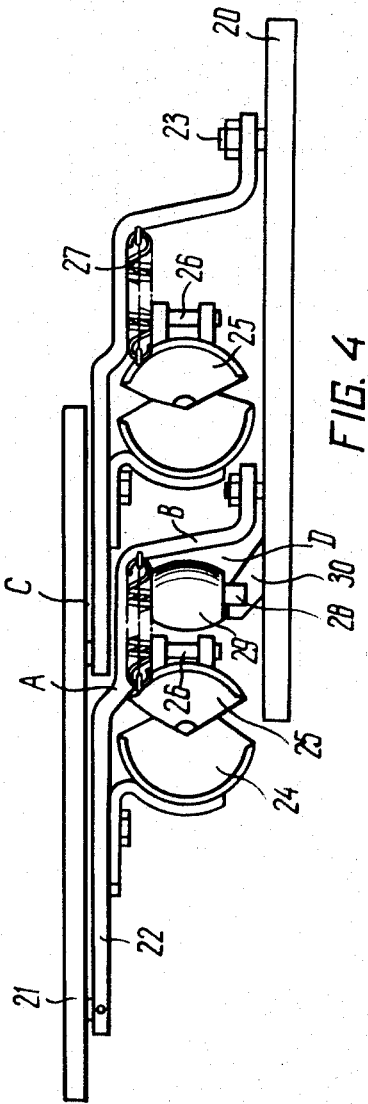

ROOT CROP PLANTER

This is a continuation-in-part application of Ser. No. 776,166, now abandoned, filed Nov. 15, 1968.

The present invention relates to machines for planting root crops, for example, sugar beet, carrot, and other crops.

Known at present are root-crop planters, wherein conical planting devices interacting with the knockouts are fixed on horizontal links whose ends are secured to the support wheels of controlled planting units.

Each planting unit of such a machine comprises two support wheels offset longitudinally and transversely so, that one of them is disposed aside of, and behind, the other one, in the direction of movement of the planter. The conical planting devices are made of two flaps, one of which is hinged to the horizontal link, the other flap being rigidly mounted on the same link.

However, the number of the planting devices and their location are chosen so that the roots can be planted with a spacing of 70 cm only.

To reduce the plant spacing, both the number of the horizontal links hinged to the support wheels, and their design must be changed. A simple increase of the number of the horizontal links does not yield the desirable result, since in this case the planting unit practically becomes inoperative.

This is due to the fact that with the increase of the number of horizontal links which perform plane-parallel motion in the vertical plane the paths of movement of the root knockouts and the planting devices intersect when they are in one horizontal plane in their upper position, the unit thus being jammed.

The trajectories of the adjacent horizontal links also intersect in the same position.

The planting units are driven only from the power takeoff shaft of the tractor through a complex and costly hydromechanical drive with a correcting arrangement, since otherwise the planting units cannot be driven without skidding, in which case the speed of the planter as a whole and the rotation speed of the wheels of the planting units are not coordinated, thus spoiling the quality of roots planting as to their vertical position.

However, the quality of work of the planting unit largely depends on its capability to follow the ground contour. The latter is significantly worsened by the fact, that the planting units follow the ground contour under the effect of their own gravity only, which is obviously insufficient on a poorly cultivated or compacted soil, causing incomplete penetration of the planting devices into soil, and hence, lower quality of the roots planting in height, and their incomplete coverage by the soil.

The concave heel knockouts of the roots involve a considerable damage of the root heads done by the sharp edges thereof, and also cause a substantial rapid wear of the movable flaps in the planting devices during their interaction, thus causing early failure of the latter.

An object of the present invention is to provide a root-crop planter that would ensure quality root drilling not only with a plant spacing of 70 cm, but with a smaller spacing, namely of 35 cm, as well, i.e. to provide a more versatile machine for planting various crops.

Another object of the present invention is to provide a root-crop planter whose drive would be simple and economical, and would secure reliable coordination of the speed of the planting devices and the speed of the machine, at the moment of root planting, i.e. to attain zero speeds of the planting devices with respect to ground at the moment of planting.

Still another object of the present invention is to provide a root-crop planter, wherein the planting units would operate in a positive floating mode, i.e. the planting units would be pressed to the ground by their own gravity, and besides, by additional forces helping better following of the ground contour by the latter, thus achieving higher quality of roots planting.

A further object of the invention is to provide a root-crop planter, that would secure higher quality of roots planting without their damaging, and would also feature a longer service life of its main working tools, namely of the root knockouts and the flaps of the planting devices.

With these and other objects in view, in a root-crop planter, comprising a frame secured on the running wheels, whereon cantilever- and hinge-mounted are planting units consisting of two longitudinally and transversely offset support wheels connected to each other by horizontal links, attached to which links are conical planting devices interacting with root knockouts, the horizontal links are, according to the invention, hinged to the rims of the support wheels so, that the distance between two adjacent links along the rim equals one eighth of the length of the wheel rim circumference, and are made with a two-step deflection, one step of which forms with the rim of the front support wheel a gap for the passage of the adjacent horizontal link, while the the other step forms with the planting devices a gap for the passage of the root knockouts, when two adjacent horizontal links are in one horizontal plane as they pass through their upper positions.

According to the invention, between the frame and the levers of the mechanism to control the sinking and lifting of the planting units there are disposed means for pressing the planting units to the ground.

Such a design of the horizontal links made it possible to increase the number of the planting devices in the planting units, which in turn permitted reducing the plant spacing of the roots to 35 cm. Besides that, such a disposition of the horizontal links allows using the conical planting devices as grousers for driving the planting units, thus dispensing with the complex hydromechanical drive operating from the power takeoff shaft of the tractor, and ensuring coordination of the speed of rotation of the planting devices with that of the planter movement. This became possible due to the fact that adjacent planting devices are permanently in soil, which rules out the possibility of any skidding of the planting unit. This, in turn, is ensured by the eight horizontal links with the planting devices in each planting unit, each of the links being secured across one-eighth of the rim length of the support wheels.

The root knockout is advisable to be made in the form of a rotary roller hinged on a bracket which is rigidly fixed to the rear support wheel.

Employment of roller knockouts significantly reduces the damaging of the root heads as they are being drilled into soil, and also reduces the wear of the movable flaps of the planting devices, as well as of the rollers themselves, since in this case the sliding of the roller against the flap is replaced by rolling.

The means to press the planting unit to the ground should advantageously be made of a hollow pipe hinged to the frame of the planting units, inside which pipe there passes a shaft with a circular collar whereon the pipe rests, this shaft being on one side hinged to the lever of the control mechanism, and on the other side connected to a spring, one end of which rests on a thrust washer fixed on the shaft, and the other end abuts against said pipe through a distance ring.

The latter ensures positive floating operation of the planting unit which performs planting of the roots in height, and reduces the vertical oscillations of the planting unit occuring on a compacted soil.

Other objects and advantages of the present invention will become apparent hereinafter while considering the description of the following exemplary embodiment thereof with references to the appended drawings, wherein:

FIG. 1 is the schematic diagram of root-crop planter according to the invention;

FIG. 4 shows the adjacent horizontal connecting links of the planting unit together with the planting devices at the moment of intersection of their trajectories in one horizontal plane, top view;

Figure 2:
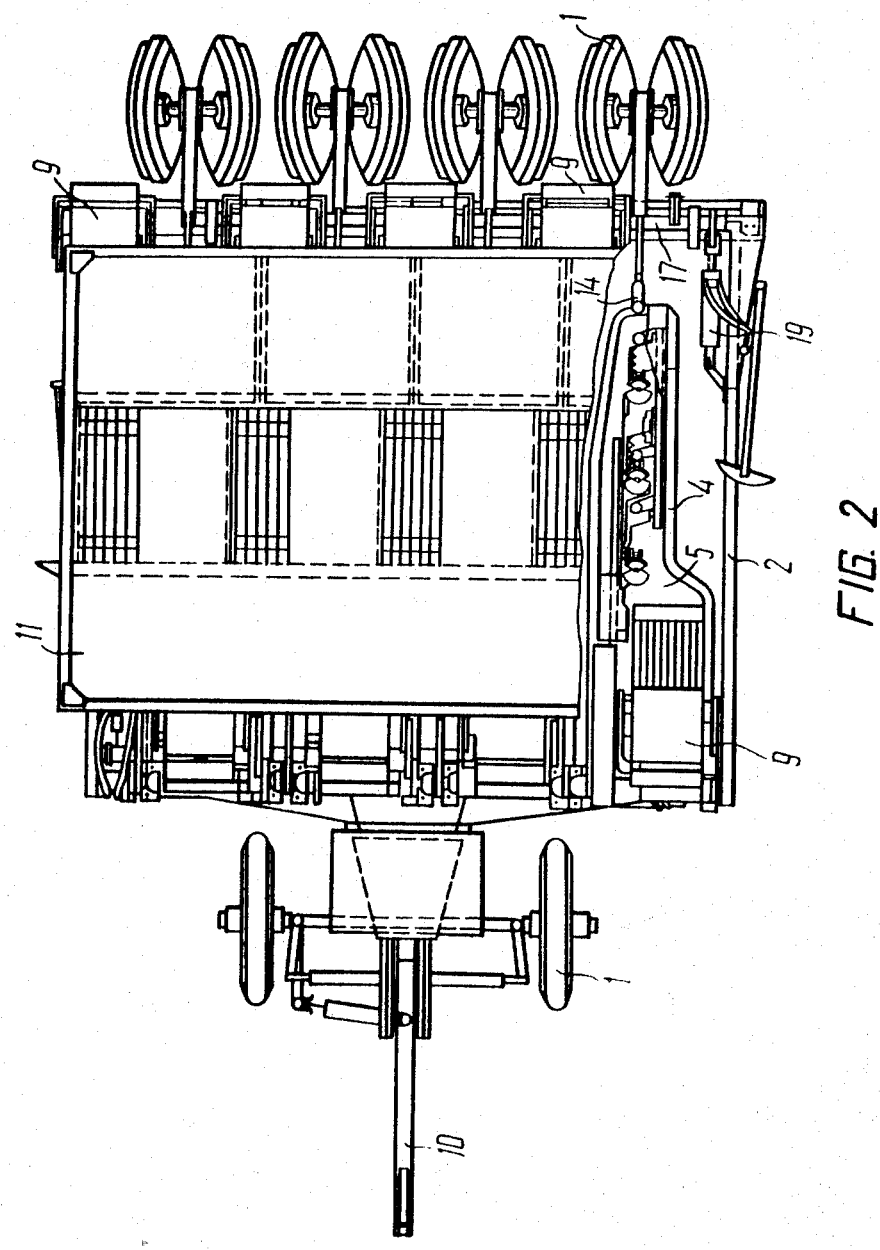
FIG. 2 shows the root-crop planter, top view.

The root-crop planter comprises running wheels 1 (FIG. 1) mounting a frame 2 made of channels and angles, secured to the front bar 3 of which frame are frames 4 of planting units 5.

Mounted in front of the planting units 5 (in the direction of the planter movement) on a swivel shaft 6 hinged to the front bar 3 are rippers 7 which are set into working (vertical) or transport (horizontal) position by means of a hydraulic cylinder 8. Fixed on frame 2 in front of, and behind, the planting units 5 are seats 9 for the servicing workers. The front running wheels 1 are secured to the steering linkage, and are connected with the tractor drawbar 10.

Mounted over the planting units 5 on the shanks of frame 2 is a hopper 11 for the roots with chutes 12 for feeding the roots to the workers. The rear section of frame 2 (FIG. 2) is carried by the running wheels 1 which also serve as packing means, The rear section of frame 4 (FIG. 1) of the planting units 5 is ears 13 connected to a means 14 for pressing the planting units to the ground, which means is in turn hinged to a mechanism 15 for controlling the lifting and sinking of the planting units by levers 16.

Levers 16 are fixed on a lateral shaft 17, at the end of which there is rigidly secured a crank 18 hingedly connected to a hydraulic cylinder 19 of the control mechanism 15.

The planting units 5 mounted on frame 4 comprise two support wheels 20, 21 (FIGS. 3,4), which are longitudinally and transversely offset with respect to each other so, that one of them, 20, is displaced to the rear relative to the second wheel 21, in the direction of movement of the planter. At the same time the front support wheel 21 is offset aside from the vertical plane wherein the rear support wheel 20 is located.

Said wheels 20 and 21 are articulated to each other by horizontal links 22 through hinges 23 (FIG. 3) located on the rims of said wheels 20 and 21.

Figure 5:
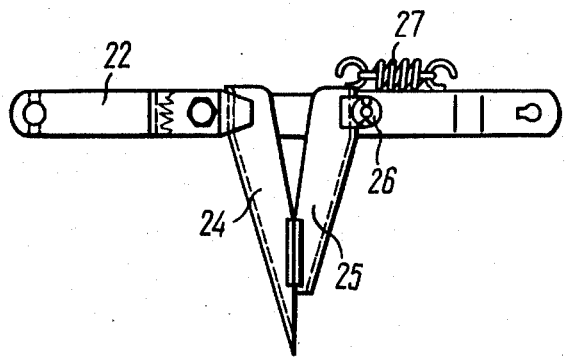
FIG. 5 shows the horizontal link with the planting device, side view.

The distance between the centers of hinges 23 are chosen so, that they equal one eighth of the length of the wheel rim circumference, which in turn permits securing on said support wheels 20 and 21 eight horizontal connecting links 22 with conical planting devices attached thereto. Said planting devices are made of two flaps 24 and 25. Flap 24 is rigidly fixed on link 22, while flap 25 is hingedly secured on a pin 26 (FIG. 5). Pin 26 is rigidly attached to the horizontal link 22. Flap 25 is in turn springed by means of a spring 27.

Fitted to the rear support wheel 20 (FIG. 3) are root knockouts 28 which interact with said planting devices.

Figure 6:
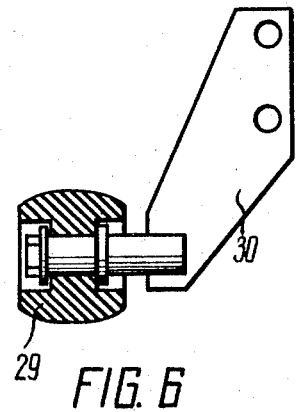
FIG. 6 shows the root knockout, side view.

The root knockouts 28 are made in the form of rotary rollers 29 (FIGS. 4,6) hingedly connected to a bracket 30. brackets 30 are bolted to the rear support wheel 20 (FIG. 4).

The horizontal links 22 are made with a two-step deflection comprising steps A and B. Step A forms with the rim of the front support wheel 21 a gap C which is necessary to rule out collision and jamming of two adjacent horizontal links 22 as their trajectories intersect. Step B forms with said planting devices a gap D to let through said root knockouts 28, which permits obviating intersection of the trajectories of the planting devices and knockouts 28 made as rollers 29.

Figure 7:
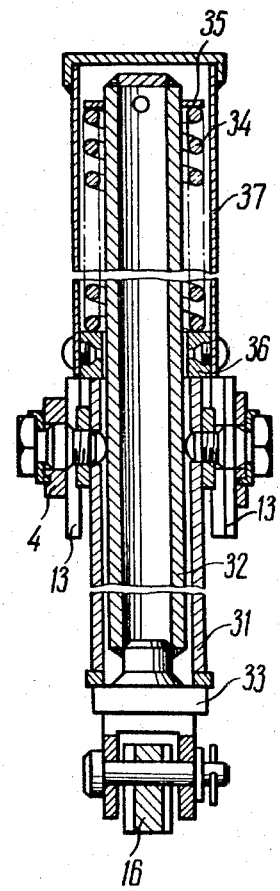
FIG. 7 shows the means to press the planting units to the ground, in section.

Means 14 (FIG. 1) to press the unit against the ground and produce positive floating operation of the latter is made of a pipe 31 (FIG. 7) hingedly secured by hinge bolts in ears 13 which are fixed on frames 4 of the planting units 5.

Passing inside said pipe 31 is a shaft 32 with a circular collar 33 whereon rests said pipe 31.

Shaft 32 is made hollow, and is articulated to lever 16 of mechanism 15 to control the lifting and sinking of the planting units.

Placed on shaft 32 is a spring 34, one end of which abuts against a thrust washer 35 pinned to shaft 32, while its other end abuts against said pipe 31 through a distance ring 36. The protruding part of shaft 32 and spring 34 are closed with a protective casing 37 screwed to said distance ring 36.

The root-crop planter operates as follows.

As the machine approaches the starting line of plating, the tractor driver actuates the hydraulic drive to turn rippers 7 (FIG. 1) into working position, and sink the planting units 5 untill the support wheels 20, 21 contact the ground surface. With the movement of the planter, the support wheels 20 and 21 of the planting units 5 start rotating. The support wheels 20 and 21 rotate without skidding, thus maintaining a permanent plant spacing, due to the fact that in the course of their rotation the conical planting devices in turn penetrate into soil, so that when one planting device emerges from the ground, the next one has already entered it.

The workers sitting on both sides of the planting units 5 take the roots from the discharge chutes 12 of hopper 11 and insert them into the approaching planting devices, which with the rotation of the wheels penetrate into soil.

When the planting device with the root is in soil, knockout 28 approaches from the top the root head, and presses against it. With the further rotation of wheels 20 and 21 of the planting units, the planting devices start emerging from soil. At this time the movement of the root knockout 28 is practically retarded, the root under the action of the latter remaining in soil, as the planting device emerges therefrom. While the planting device is coming out from soil, knockout 28 keeps the root there at a certain depth, and at the same time presses onto the movable flap 25 of the planting device, the flap turning and letting knockout 28 to exit from the planting device. Thereupon knockout 28 moving together with the rear support wheel 20 separates from the head of the root, which remains in the hole formed by the planting cone, and recedes upwards.

Figure 3:
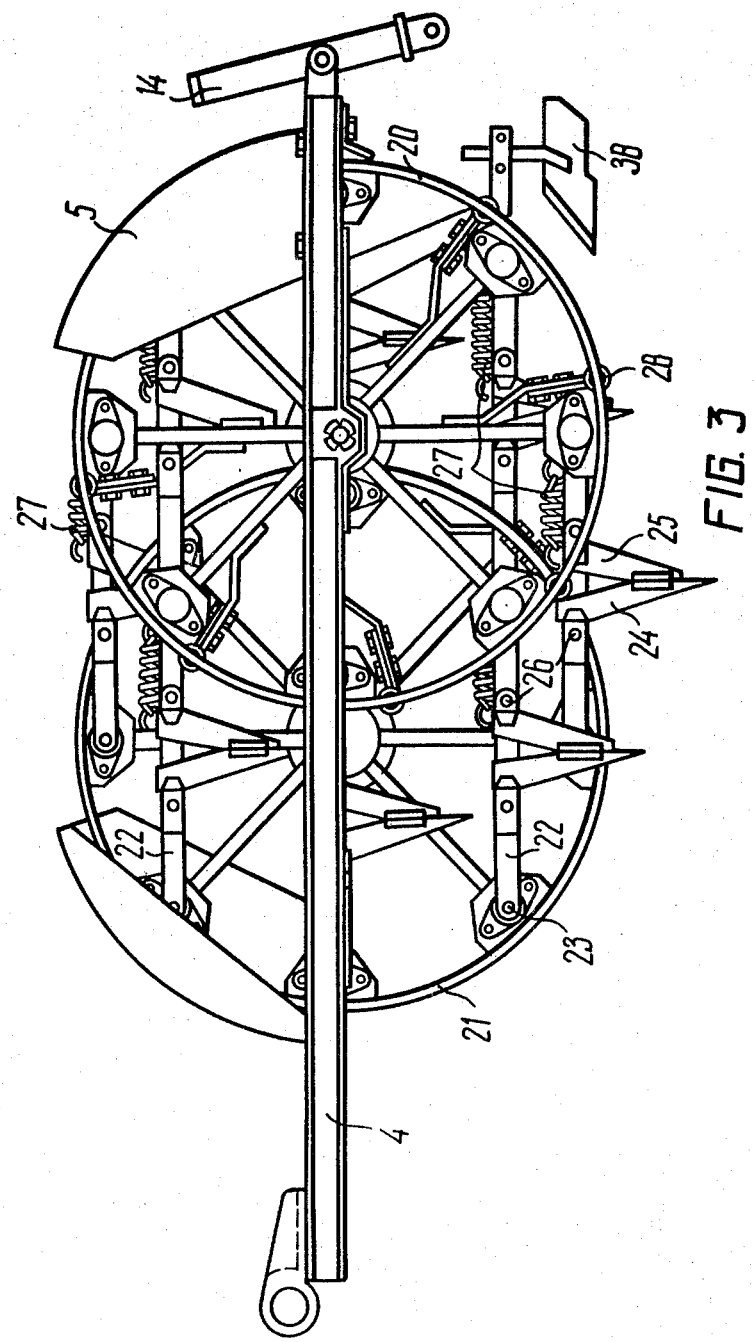
FIG. 3 shows the planting unit, side view.

The root head is additionally covered with soil by means of arrangements 38 (FIG. 3). Then the soil is packed on both sides by wheels 1 (FIG. 2).

If the machine moves across a poorly cultivated, compacted soil, a situation occurs when the planting devices do not fully penetrate into soil, and the work of the planting unit 5 (FIG. 1) is accompanied with sharp vertical oscillations taking place as the planting cones enter the ground. To attain complete penetration of these planting devices into soil, additional forces must be developed for pressing the planting units against the ground, reducing vertical oscillations, and improving the cohesion of the planting devices with soil. These forces are created by the pressing means 14 (FIG. 1) secured between frame 4 of the planting unit and levers 16 of the lifting mechanism 15. As the planting units 5 are sunk into working position, the support wheels 20 and 21 contact the ground at a moment when the piston rod of the hydraulic cylinder 19 has not yet completed its stroke. With the further movement of the piston rod of the hydraulic cylinder 19, shaft 32 (FIG. 7) of said pressing means 14 starts emerging from pipe 31 and compressing spring 34. The compression force of spring 34 is in turn transmitted to pipe 31 connected with frame 4 of the planting units 5. Hence, frame 4 of the planting units 5 takes up the force of spring 34, and will transmit this force to the planting devices which will now more fully penetrate into soil, the vertical oscillations being also considerably reduced. The latter is of particular importance, since the speed of the planter equals 2–3.6 km/hr, which is quite significant with manual insertion of the roots into the planting devices.

What we claim is:

1. A root-crop planter, comprising: a frame mounted on running wheels; a hopper for the roots fitted on said frame; planting units hingedly secured on said frame under said hopper, each of these units comprising two support wheels longitudinally and transversely offset relative to each other so, that one of the wheels is displaced aside and to the rear, of the other wheel, with regard to the direction of movement of the planter; horizontal links connecting said wheels to one another, and hinged to the rims of the latter so, that the distance between the centers of two adjacent hinges along the rim equals one eighth of the length of the wheel rim circumference; conical planting devices attached to said horizontal links, and each made of two flaps, one of which is hinged to said link, and the other is rigidly fixed to the same link; root knockouts interacting with said planting devices, and secured on said rear support wheel, said horizontal links being made with a two-step deflection, one of said steps forming with the rim of said front support wheel a gap for the passage of said adjacent horizontal link, and said other step forming with the planting device a gap for the passage of said root knockouts, as said two adjacent links are disposed in one horizontal plane; a mechanism to control the lifting and sinking of said planting units, which is attached to said frame of the planter; means to press said planting units to the ground, which are located between the frame of said planting unit and the levers of said mechanism to control the sinking and lifting of the planting units.

2. A planter as in claim 1, wherein said root knockout is made in the form of a rotary roller hinged on a bracket which is rigidly fixed to the rear support wheel;

3. A planter as in claim 1, wherein the means to press the planting unit to the ground is made of a hollow pipe hingedly connected to the frame, inside which pipe there passes a shaft with a circular collar whereon said hollow pipe rests, said shaft being on one side hinged to the lever of the control mechanism, and on the other side connected to a spring, one end of which rests on a thrust washer fixed on the shaft, and the other end abuts against said pipe through a distance ring.

* * * * *